United States Patent [19]

Rizkowski et al.

[11] Patent Number: 5,065,370
[45] Date of Patent: Nov. 12, 1991

[54] PROGRAMMABLE PULSE SHAPER FOR SONOBOUY APPARATUS

[75] Inventors: Keith S. Rizkowski, Burlington, N.J.; David E. Zeidler, Hatboro, Pa.

[73] Assignee: The United States of America as represented by the Secretary of the Navy, Washington, D.C.

[21] Appl. No.: 619,781

[22] Filed: Nov. 28, 1990

[51] Int. Cl.[5] .............................................. H04B 1/59
[52] U.S. Cl. .......................................... 367/3; 367/2
[58] Field of Search ................. 367/2, 3, 137; 434/10, 434/8, 6

[56] References Cited

U.S. PATENT DOCUMENTS 4,631,708 12/1986 Wood et al. .......................... 367/2

Primary Examiner—Daniel T. Pihulic
Attorney, Agent, or Firm—James V. Tura; James B. Bechtel; Susan E. Verona

[57] ABSTRACT

This invention discloses electronic circuit that can be either embedded in an oceanographic sonobuoy housing or used as stand-alone equipment and which establishes and generates sonar signals of a repetition rate, pulse length, and amplitude pulse shape which are all programmably variable, selectable and determinable. A plurality of predetermined sonar pulse "profiles" are stored in a read only memory (ROM). A particular profile is selected from this memory and this profile is generated point by point at a selected frequency.

20 Claims, 1 Drawing Sheet

PROGRAMMABLE PULSE SHAPER FOR SONOBOUY APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to oceanographic and sonar type signal processing equipment. In particular, it relates to electronic circuitry for generating various pulse signal shapes for the enhancement of active sonar signal performance.

Oceanographic and/or sonar signal equipment can be designed to be operated at various frequencies. While some sonar equipment in the past has been designed to operate at a fixed frequency, other sonar equipment has been adjustable between frequencies. This adjustment, however, has been cumbersome and has not been programmable. Changes in frequency have been made in the past by physically changing base clock frequencies, i.e. changing the drive oscillator frequency.

With sonar equipment where changes in frequency signals can be made, it has been up to the judgement or "guess" of the technician intended to judge the performance of the equipment with replacements in oscillators for installing a new operating sonar pulse frequency. However, none of this prior art has addressed the shape of a single sonar pulse, nor the propagation and reflection characteristics of sonar pulses as a function of pulse profile.

There are no presently known methods for adjusting sonar pulse shapes for altering or adjusting sonar performance.

SUMMARY OF THE INVENTION

An object of the present invention is to provide an electronic circuit for generating tailored pulse envelopes adaptable to sonar signal generators.

A second object of the present invention is to provide such a tailored pulse generator of a compact and economical design so that it can be implemented as expendable sonobuoy housed hardware.

A further object of the present invention is to provide such a pulse generator which is programmable, thereby permitting investigation of the effects and advantages of shaped pulses in active sonar detection of doppler targets.

Still further objects of the present invention are achieved by a programmable pulse shaper which can be housed in a sonobuoy or used as external, stand-alone test equipment.

Further objects of the present invention are achieved in a programmable pulse shaper which is capable of creating pulses with predetermined and adjustable lengths, shapes and repetition rates.

Further objects of the present invention are achieved in a programmable pulse shaper which stores envelope data for generating any selected pulse in programmable memory.

These and other objects of the invention are achieved where the invention circuitry in its entirety can be housed either in a sonobuoy or a separate piece of equipment and addressed or triggered from a remote location. A free running oscillator provides a basic pulse train which is divided-down to provide circuit timing pulses which are then used to gate sonar output pulse generation. A memory device contains a plurality of instructions or data words which equate to pulse shape. Instructions are paged from this memory as a function of pulse enable timing signals and circuit timing pulses. A synthesizer signal is mixed with the pulse shape memory word to generate an amplitude shaped pulse output signal from a digital to analog multiplier.

BRIEF DESCRIPTION OF THE DRAWINGS

The festures, advantages and operation of the present invention will be better understood from a reading of the following Detailed Description of the Invention in conjunction with the following drawings in which like numerals refer to like elements and in which.

DETAILED DESCRIPTION OF THE PREFERRED EMBODIMENT

Figure 1:
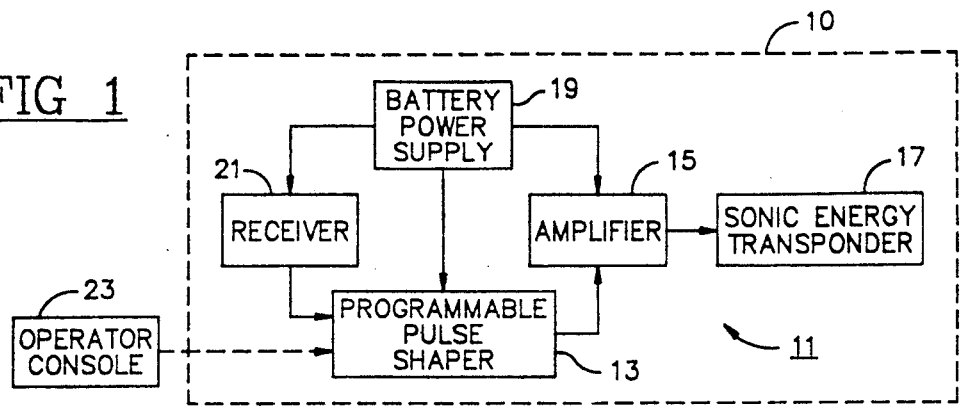
FIG. 1 is a circuit block diagram of a sonobuoy containing the programmable pulse shaper circuitry of the present invention.

A sonobuoy housing 10, FIG. 1, houses a sonic signal pulse selection generator circuit 11. This sonic signal pulse selection generator circuit 11 generates amplitude shaped sonar pulses. The shaping of the pulses reduces the reverberation about the center frequency of the sonar pulse and thus allows for improved detection of low doppler targets. The invention has the ability to select from one of a plurality of different amplitude shapes for "source" sonar pulses at any one time. This permits a real time direct comparison of sonar performance as a function of reflected signal intensity and noise levels. Sonar source signal optimization can therefore be achieved in real time modes of operation.

A programmable pulse shaper circuit 13 is the circuit device which is responsible for generating the sonar pulse shapes. This pulse shaper circuit provides its output to an amplifier or driver circuit 15 which in turn drives a sonic energy transponder 17 located within the sonobuoy 10 housing.

A battery power supply 19 supplies the necessary electrical energy to power the programmable pulse shaper circuit 13 and the driver amplifier 15. A radio receiver unit 21, which may also be housed within the sonobuoy 10, can also be powered from the battery power supply 19.

The radio receiver unit 21 can be connected to the programmable pulse shaper circuit 13 to automatically select certain operational parameters from a separate location. In this way, a technician positioned on a control ship some distance from the particular sonobuoy 10 can adjust operating parameters for the programmable pulse shaper circuit 13 while the sonobuoy 10 is in situ.

The adjustable operating parameters for the programmable pulse shaper circuit 13 can also be adjusted prior to the sonobuoy 10 being positioned in the water. In this instance an operator console 23 can be connected to the programmable pulse shaper circuit 13 to provide the adjustable parameter selection inputs. In this way, the operator console 23 acts in parallel to the radio receiver unit 21 and provides substitute signals therefor.

Figure 2:
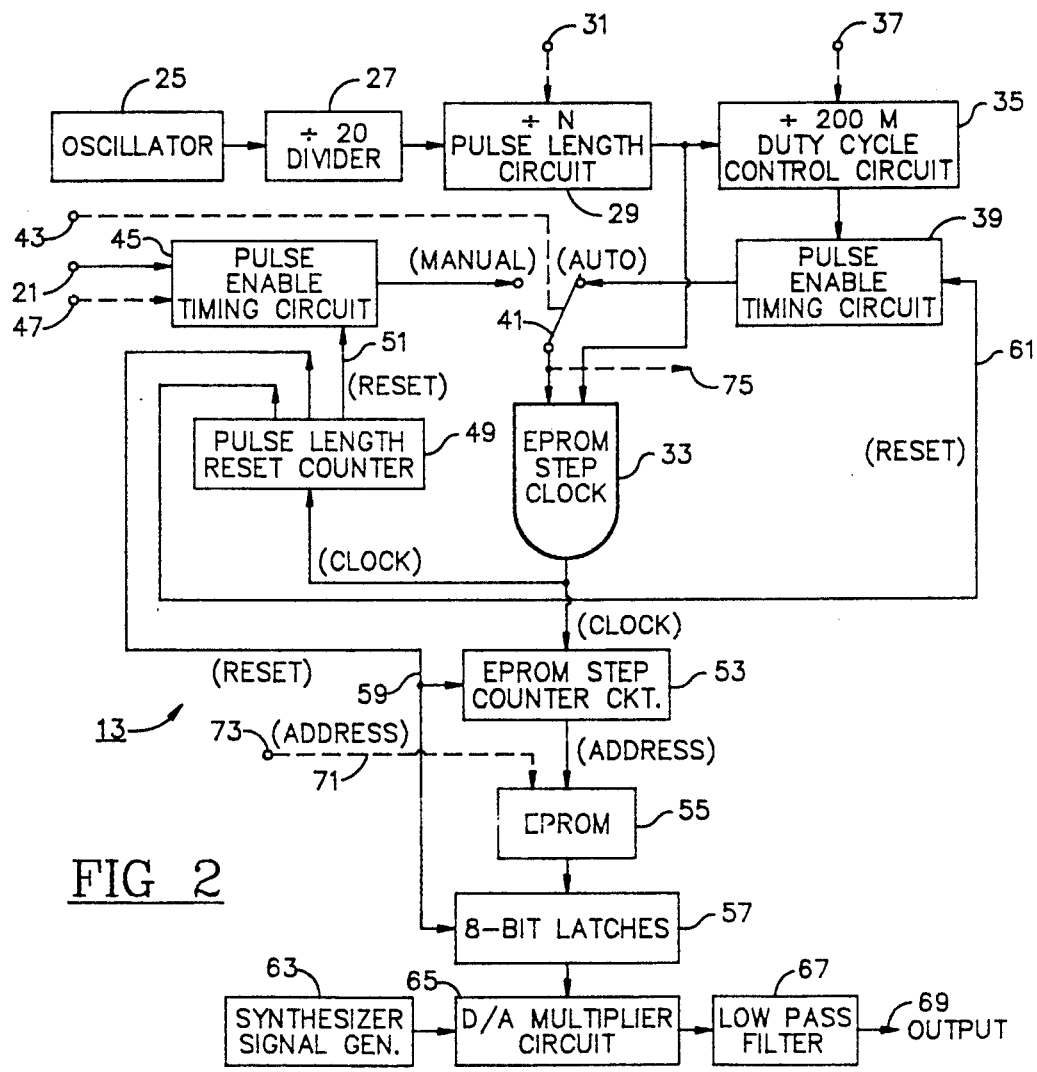
FIG. 2 is a circuit block diagram of the programmable pulse shaper circuitry of FIG. 1 with operator console interface.

The programmable pulse shaper circuit 13 is shown in greater detail in FIG. 2. An oscillator circuit 25 can be utilized to provide a free running pulse train of digital signals to be used by the circuit 13. The output of this oscillator 25 is fed to a divider circuit 27 which digitally divides the pulse frequency provided from the oscillator 25. Typically, this divider 27 is set to divide by the number twenty (20).

The output from the divide-by-twenty divider circuit 27 is fed into a pulse length circuit 29. This pulse length circuit 29 again divides the pulse frequencies by a value "N". This value "N" is set into the pulse length circuit from an operator console select 31. The output from the divide by "N" pulse length circuit 29 is fed into a two input AND gate 33 which acts as an EPROM step clock circuit.

A duty cycle control circuit 35 receives and operates upon signals provided by the output of the pulse length circuit 29. This duty cycle control circuit 35 divides the frequency of the signals provided from the pulse length circuit 29 by a value equal to 200 m, where "m" is a multiplier value between 1 and 999. The value "m" is set into the duty cycle control circuit 35 from an operator console multiplier select switch 37.

A pulse enable timing circuit 39 receives signals from the duty cycle control circuit 35. This pulse enable timing circuit 39 then feeds its output to a two-position selector switch 41. When this selector switch 41 is in the automatic operation mode, the output from the pulse enable timing circuit 39 is connected into the second input of the EPROM step clock circuit 33. When the switch 41 is in the opposite position, the output of the pulse enable timing circuit 39 is left in the manual mode.

The operator console 23 contains a switch select 43 which is connected to select the position of the selector switch 41. In the manual mode of operation for the programmable pulse shaper circuit 13, this switch 41 opens the connection from the output of the pulse enable timing circuit 39 and makes a connection from a second, manual mode of operation, pulse enable timing circuit 45. This second pulse enable timing circuit 45 is triggered by and operates upon a trigger signal 47 received from the operator console 23.

A pulse length reset counter circuit 49 keeps count of the output pulses from the EPROM step clock circuit 33. Each pulse output from this circuit 33 clocks the pulse length reset counter 49. When this reset counter 49 reaches a predetermined value, it provides a reset output pulse 51 to the manual mode pulse enable timing circuit 45 to reset that circuit 45.

The output from the EPROM step clock circuit 33 is also sent to an EPROM step control circuit 53. The EPROM step control circuit 53 steps through a plurality of sequential values which it outputs as ROM memory addresses. These memory addresses are fed into an EPROM (erasable programmable read only memory) 55. This EPROM 55 can be implemented by commercial devices available in the marketplace from a number of manufacturers, and can be a device which is equivalent to an Intel Corporation model 2716.

Data, the amplitude shape of the sonar pulse, exiting EPROM 55, as a result of the address input thereinto from step control circuit 53, is sent to an eight-bit latch circuit 57. This latch circuit 57 operates as the temporary storage output register for the EPROM 55 and can be implemented by commercial devices available in the marketplace from a number of manufacturers including a Texas Instruments, Inc., type 74174 latch circuit.

The pulse length reset counter 49 also provides a reset signal 59 connected to reset the EPROM step counter circuit 53 and connected to reset the eight-bit latch circuit 57. The pulse length reset circuit 49, further, provides a third reset signal 61 which is fed into the pulse enable timing circuit 39 to reset that circuit 39.

A synthesizer circuit 63 operates as a signal generator. This synthesizer circuit 63 has its output connected into a digital to analog multiplier circuit 65. This D/A multiplier circuit 65 also receives the value on the eight-bit latch circuit 57. The composite inputs cause the D/A multiplier circuit to provide a pulse envelope output which is sent on to a low pass filter circuit 67. The output from the low pass filter circuit 67 forms the output signal 69. This output signal 69 is the amplitude shaped output pulse from the programmable pulse shaper circuit 13 of FIG. 1.

The programmable pulse shaper circuit 13 generates an amplitude shaped pulse of a preselected duration and envelope shape. This pulse is provided on the output 69. It can generate this pulse at preselected intervals established by the duty cycle control circuit 35 when the switch 41 is in the automatic mode. When the switch 41 is in the manual mode, the circuit will generate a single pulse upon the receipt of an external gate signal from the receiver 21 or from the operator console trigger signal 47.

The amplitude shape of any signal generated by the circuit 13 is a function of the values programmed into the EPROM 55. Each individual pulse shape is stored as 200 separate amplitude points as a function of 200 separate values stored in the EPROM 55. Collectively, these values represent the envelope of the pulse shape produced by the circuit 13. Each point or value is stored at an address in the EPROM 55. When that address is loaded into the EPROM 55, the respective value stored at that address is loaded into latch circuit 57. As EPROM 55 has a storage capacity of greater than 200 eight-bit words the number of different pulse shapes stores in this memory 55 will be dependent upon that memory's size or capacity.

Each amplitude point is stored as an eight-bit positive binary number. As an example, any number of different shapes of pulse envelopes can be generated from the data transferred from the EPROM 55 into the eight-bit latch circuit 57 depending upon component selection. The selection of a particular pulse profile is made by a three-bit address 71 received by the EPROM from the operator console pulse shape select 73 or an equivalent selection signal received by the receiver 21 and the eight least significant bits of the address received the step circuit 53.

As an example, the EPROM 55 three most significant address bits can be controlled by a BCD thumb wheel switch located on the operator console 23. This operation can be used to select one of the pulses stored in the memory 55.

A gate output pulse (75) indicates the beginning of the output shaped sonar pulse, and remains high for the duration of the sonar pulse. This gate out signal 75 can also be passed onto down line or to external circuitry to trigger that circuitry in synchronization with the pulse shaper circuit 13.

In reference to the circuitry described in connection with FIG. 2, the invention may be further implemented as follows. Oscillator 25 is implemented by a TTL 4 MHz crystal oscillator or another single package complete oscillator. The 4 MHz square wave signal provided by the oscillator 25 is divided by 20 by the TTL or LSI implemented divider 27 to give a 200 KHz square wave signal which is input into the TTL or LSI implemented pulse length circuit 29. Pulse length circuit 29 provides a divide by "N", the "N" is the desired pulse length of the shaped pulse in milliseconds. The output of this pulse length circuit 29 is also the clock stepping frequency for the EPROM 55.

If a technician was to select the pulse length of a 100 milliseconds on the operator console 23, then the output of the pulse length circuit 29 would be 2 KHz. With this frequency output from the pulse length circuit 29, the EPROM 55 would output each successive step, which is used to generate the desired output pulse 69 profile, every 0.5 milliseconds as established by the 2 KHz clock pulse provided by the pulse length circuit 29. Since there are 200 steps which are used to define each output 69 pulse envelope, the total pulse length for the pulse generated from the 2 KHz timing signal would be 200 times 0.5 milliseconds or 100 milliseconds.

The pulse length circuit 29 output is input to the divide by 200 m duty cycle control circuit 35. When a rising edge signal is output from the duty cycle control circuit 35, the pulse enable timing circuit 39 starts another pulse. Pulse enable timing circuit 39 and pulse enable timing circuit 45 can be implemented as TTL or LSI implemented gated devices.

When the automatic mode is selected using the switch 41, the duty cycle control circuit 35 controls the repetition rate of the shaped pulse. If, for example, "m" is set equal to "two" in the duty cycle control circuit 35, then the duty cycle control circuit 35 becomes a divide by 400 circuit. If, for example, the frequency out from the pulse length circuit 29 is 2 KHz, then the output of the duty cycle control circuit 35 will be a 5 Hz signal. This signal will produce another pulse every 200 milliseconds. Since the pulse length is 100 milliseconds the duty cycle is 50 percent. This will enable 50 percent of the pulses from circuit 29 to be gated through the EPROM step clock circuit 33. This circuit 33 can be simply implemented with a logical AND gate.

Pulse length reset counter 49 is a countdown counter set at 200. When the counter 49 counts down to "zero", the reset pulse 51, 59 and 61 resets the respective pulse enable timing circuit 45, 53, 55, 57 and 39. At this point, the EPROM 55 has stepped through all 200 points or values constituting a particular shaped pulse envelope. A next output transmission from the duty cycle control circuit 35 will initiate a repeat of the process.

If the switch 41 is set in the manual mode, the pulse enable timing used by the EPROM step clock circuit 33 will come from the manual pulse enable timing circuit 45. This manual mode of operation is conducted only upon a manual trigger for generating a single pulse envelope. Repetitive pulses must be repetitively manually triggered.

The EPROM step counter circuit 53 is designed to address the EPROM 55 at each of 200 addresses containing 200 amplitude points defined by eight-bit words. The counter circuit 53 provides successive addresses to successively step through all the points necessary to define a single output pulse 69 envelope. As with the other circuit elements described above, a reset pulse will reset the EPROM step counter circuit 53 to its initial value.

The output of the eight-bit latch circuit 57 controls the multiplication coefficient of the D/A multiplier circuit 65. These circuit components can be TTL or LSI implemented. This circuit 65 multiplies the synthesizer circuit 63 signal by the multiplication coefficient entered from the latch circuit 57. The result is the amplitude of the output pulse 69 at a given point in time. The output pulse 69 signals are then filtered via the low pass filter 67 to remove switching transients. While a CW signal is used from synthesizer 63, a frequency swept signal could be substituted therefor. It is not necessary that a continuous wave signal be utilized.

The present invention will produce a multiple of programmably predetermined amplitude shaped sonar pulses of pulse lengths ranging from 1 millisecond to 100 seconds, in selected increments of 1 millisecond steps, with a duty cycle in the range of 0.1 percent to 50 percent. With the type 2716 EPROM, as many as 8 pulse shapes can be stored, when using eight-bit words to define each amplitude point, and 200 points to define each pulse envelope profile.

Different selections for circuit components could be made which would enlarge, narrow or otherwise alter the capacity of the invention without departing from the intent or scope thereof. Various other memory devices could be substituted for the type 2716 EPROM 55. Other changes could be made to the circuit without departing from the intent or scope of the invention. It is intended, therefore, that the above description be read as illustrative of the invention and not be taken in the limiting sense.

What we claim is:

1. An oceanographic-type sonar pulse generator for providing pulse drive signals for generating sonar pulses, said pulse drive signals being programmably selectable as to repetition rate and as to pulse envelope profile and pulse length comprising:

a programmable pulse shaper circuit for generating output signals with preselected pulse envelopes;

a sonic energy transponder for producing sonar pulses and for receiving reflected sonar pulses;

a drive amplifier connected between the output of said programmable pulse shaper circuit and the input of said sonic energy transponder, said drive amplifier driving said transponder in response to the output of said programmable pulse shaper circuit; and a power supply connected to power said programmable pulse shaper circuit and said drive amplifier.

2. The sonar pulse generator of claim 1 also including a receiver circuit, said receiver circuit being connected to said programmable pulse shaper circuit for setting circuit parameters thereof.

3. The sonar pulse generator of claim 1 also including an operator console, said operator console being connected to said programmable pulse shaper circuit for setting circuit parameters thereof.

4. The sonar pulse generator of claim 1 wherein said programmable pulse shaper circuit includes:

an oscillator for providing a pulse train of square wave pulses;

a pulse frequency dividing circuit connected to the output of said oscillator;

a pulse enabling circuit connected to said frequency dividing circuit and selectively providing an enabling signal;

a gating circuit for passing pulse signals connected from said frequency dividing circuit in the presence of an enabling signal connected from said pulse enabling circuit;

a programmable electronic memory containing a plurality of values representing pulse profile points of sonar pulses, said values being grouped in said programmable electronic memory in groups representing a complete and unique sonar pulse;

circuit means for addressing said electronic memory for causing said memory to output sequentially the values representing a sonar pulse selected, said addressing means having a connection to said gating circuit and being responsive to pulse signals passed thereby;

a free running synthesizer signal generator; and a D/A multiplier circuit connected to said free running signal generator for operating upon and passing the signals therefrom, said D/A multiplier circuit being connected to said programmable electronic memory for having its multiplication coefficient set as a function of the instantaneous value received therefrom, the output from said D/A multiplier circuit being a sonar source pulse.

5. The sonar pulse generator of claim 4 also including a low pass filter connected on the output of said D/A multiplier circuit.

6. The sonar pulse generator of claim 5 wherein said programmable electronic memory includes a read only memory containing said plurality of values and connected to said addressing circuit means; and a latch circuit connected to said read only memory for holding a particular instantaneous value address in said read only memory, said latch circuit having its output connected to said D/A multiplier circuit for setting said multiplication coefficient thereof.

7. The sonar pulse generator of claim 6 wherein said addressing circuit means includes a memory step control circuit connected to said gating circuit and generating a memory address in response to pulse signals received from said gating circuit, said memory step control circuit output being connected to address said read only memory.

8. The sonar pulse generator of claim 7 wherein said pulse frequency dividing circuit includes a frequency divider circuit connected to said oscillator output for dividing said oscillator pulse frequency by a predetermined constant; and a pulse length determining circuit connected to the output of said frequency divider circuit, the output of said pulse length determining circuit being connected to said gating circuit and to said pulse enabling circuit.

9. The sonar pulse generator of claim 8 wherein said pulse enabling circuit includes a duty cycle control circuit connected to the output of said pulse length determining circuit; and a pulse enable timing circuit connected to the output of said pulse length determining circuit, the output of said pulse enable timing circuit being connected to said gating circuit.

10. The sonar pulse generator of claim 9 also including a pulse length reset counter, said pulse length reset counter being connected on its input to the output of said gating circuit and being clocked therefrom, said pulse length reset counter having a reset output connected to said pulse enable timing circuit, to said read only memory step counter circuit and to said latch circuit.

11. The sonar pulse generator of claim 10 wherein said duty cycle control circuit is a divide by 200 m circuit where "m" is programmably set at a value from 1 to 999.

12. The sonar pulse generator of claim 11 wherein said pulse length determining circuit is a divide by "N" circuit where "N" is programmably set.

13. The sonar pulse generator of claim 12 wherein frequency dividing circuit is a divide by 20 circuit.

14. The sonar pulse generator of claim 13 wherein said latch circuit is an eight-bit latch register; and wherein said read only memory is an eight-bit EPROM.

15. The sonar pulse generator of claim 14 wherein said gating circuit is a two-input AND gate.

16. The sonar pulse generator of claim 15 wherein said free running signal generator is a synthesizer signal generator.

17. The sonar pulse generator of claim 12 also including a programming circuit means, said programming circuit means being divide by 200 m duty cycle control circuit and to said read only memory.

18. The sonar pulse generator of claim 9 also including a second pulse enabling circuit and a two position switch, said switch being operable to connect selectively and exclusively the output from said pulse enabling circuit and the output from said second pulse enabling circuit to said gating circuit.

19. The sonar pulse generator of claim 18 also including a programming circuit means beings connected to discretely trigger said second pulse enabling circuit.

20. The sonar pulse generator of claim 19 wherein said programming circuit means is an operator console for providing individual, discrete trigger pulses to said second pulse enabling circuit.

* * * * *